United States Patent [19]

Dancy et al.

[11] Patent Number: 4,562,058

[45] Date of Patent: Dec. 31, 1985

[54] PROCESS FOR CRYSTALLIZING POTASSIUM SULFATE

[75] Inventors: William B. Dancy, Carlsbad, N. Mex.; Hsi Meng, Northbrook, Ill.

[73] Assignee: International Minerals & Chemical Corp., Terre Haute, Ind.

[21] Appl. No.: 715,708

[22] Filed: Mar. 25, 1985

Related U.S. Application Data

[63] Continuation-in-part of Ser. No. 519,445, Aug. 2, 1983, abandoned.

[51] Int. Cl.⁴ .......................... C01D 15/06; C01F 5/38
[52] U.S. Cl. ..................................... 423/551; 423/166; 423/193; 423/266; 423/497; 423/552; 423/554; 23/298; 23/300; 23/302 R
[58] Field of Search ............... 423/191, 193, 205, 166, 423/265, 266, 499, 551, 552, 554, 497; 23/298, 300, 302 R, 303

[56] References Cited

U.S. PATENT DOCUMENTS

| | | | |
|---|---|---|---|
| 2,295,257 | 9/1942 | Butt et al. | 423/552 |
| 2,437,182 | 3/1948 | Barr et al. | 23/302 |
| 2,743,288 | 4/1966 | Rueggeberg et al. | 260/400 |
| 3,598,545 | 8/1971 | Lehman | 23/300 |
| 3,770,390 | 11/1973 | Teot | 23/300 |
| 3,843,772 | 10/1974 | Boeglin | 423/551 |
| 3,853,490 | 12/1974 | Boeglin et al. | 23/300 |
| 3,876,639 | 8/1972 | Barlow | 23/300 |

*Primary Examiner*—Gary P. Straub
*Attorney, Agent, or Firm*—Robert H. Dewey

[57] ABSTRACT

An improved process for the production of potassium sulfate crystals by the reaction of saturated solution of potassium chloride with langbeinite in the solid phase at a temperature of from 45°–55° C., thereby forming potassium sulfate crystals and magnesium chloride solution comprising the step of conducting the reaction in the presence of a growth enhancer comprising monosulfonated or monosulfated surfactant and a neutralized disulfonated surfactant in a weight ratio of from about 0.14 to 0.69.

6 Claims, No Drawings

PROCESS FOR CRYSTALLIZING POTASSIUM SULFATE

CROSS-REFERENCE TO RELATED APPLICATIONS

This application is a continuation-in-part of applicants' copending application, Ser. No. 519,445, filed Aug. 2, 1983, now abandoned.

This invention relates to a process for crystallizing potassium sulfate. In a particular aspect, this invention relates to a process for enhancing the crystal size of potassium sulfate crystals.

Langbeinite, a naturally occurring double salt of potassium and magnesium sulfate, is used as the raw material for commercial production of potassium sulfate for the fertilizer industry. Comminuted langbeinite (usually less than 200 mesh) in the solid phase is reacted with a saturated aqueous solution of potassium chloride containing sufficient solid phase potassium chloride to drive the reaction to completion. The magnesium sulfate from langbeinite is converted to the very soluble magnesium chloride and the potassium sulfate crystallizes. It is then separated, dried and sent to storage. The reaction is conducted at a temperature of 45°–55° C. which enables a reaction time of 6 hours or less, which is important for commercial operation.

The potassium sulfate obtained by this process is in the form of fine crystals, nearly all of which will pass a 65 mesh Tyler screen and are unsuitable for most markets because they tend to cake and cause fugitive dust emissions in violation of State and Federal regulations. The preferred crystal size is that retained on a 20 mesh screen and ideally this fraction will be equally distributed between 6 and 20 mesh.

The problem of small crystal size is one of longstanding importance to the industry and there have been many attempts to solve it. For example, A. F. Nylander, U.S. Pat. No. 3,271,106 disclosed that crystal size could be enlarged by effecting the crystallization in the presence of specific neutralized sulfonic acids or acid sulfates, such sulfonated fatty acids and sulfated alcohols. The acids were neutralized with sodium, potassium, magnesium or triethanolammonium hydroxides. This process worked well in the laboratory but when adapted to commercial size, it was found that a reaction time of more than six hours was required and was, therefore, impractical.

Accordingly, there has been a long and pressing need for a crystal growth enhancer for potassium sulfate.

SUMMARY OF THE INVENTION

It is an object of this invention to provide a process for crystallizing potassium sulfate.

It is another object of this invention to provide a process for enhancing the growth of potassium sulfate crystals.

Other objects of this invention will be apparent to those skilled in the art from the description herein.

It is the surprising discovery of this invention that a crystal growth enhancer comprising a combination of component A, which is a neutralized mono-sulfonic acid or sulfated fatty acid, including but not limited to mixtures thereof and component B, which is a neutralized alkylated diphenyloxide disulfonic acid, enhances crystal growth of $K_2SO_4$ to give a satisfactory yield of +20 mesh crystals within an acceptable reaction time. According to the improved process, the reaction between solid phase langbeinite with saturated aqueous potassium chloride solution is conducted at 45°–55° C. in the presence of from 1.2 to 2.4 kg of the crystal growth enhancer per ton of langbeinite. The mono-sulfonate or mono-sulfate is present in a ratio of from about 0.14 to 0.60 parts by weight per part of the disulfonate, preferably about 0.20 to 0.50, and when a mixture of monosulfated fatty and alkyl diphenyloxide monosulfonate is used, the ratio is from 1.66 to 20 parts of neutralized sulfated fatty acid per part of neutralized alkyl diphenyloxide monosulfonates.

DESCRIPTION OF THE PREFERRED EMBODIMENT

The sulfonic acids useful in the practice of this invention are known in the art. The preferred disulfonates are the alkylated diphenyloxide sulfonates wherein the alkyl group is from 10 to 14 carbon atoms, and may be straight chain or branched chain including mixtures thereof. The compound wherein the alkyl is straight chain, e.g. lauryl, is particularly preferred. The latter compound is commercially available and the commercial product is suitable for the practice of this invention. The disulfonic acids may be neutralized by any suitable monovalent cation, e.g. sodium, potassium, alkylamine or alkanolamine, but sodium is preferred as being most economical. A particularly preferred disulfonate is marketed by Conco Chemical Company as Conco 2Al. The alkyl group is straight chain and the product contains the monosulfonate in an amount of about 15% of total surfactants, i.e. a ratio of about 0.176. This ratio is not high enough to provide maximum crystal growth but less fortifying is necessary than with, e.g. Dowfax 2Al marketed by Dow Chemical Company, which contains only 5% of the monosulfonate for a ratio of about 0.05. This latter product contains a branched alkyl group and it has been found that higher ratios of sulfated fatty acids are required when the alkyl group is branched chain than when it is straight chain. Since sulfated fatty acids slow the reaction rate of langbeinite, it is advantageous to minimixe the sulfated acids consistent with the desired crystal size. For example, when the straight alkyl chain compound is used, excellent results are obtained with a volume ratio of 1 part sulfated oleic acid to 4 parts of Conco 2Al whereas when the branched chain alkyl compound (Dowfax 2A1) is used, a volume ratio of 1:1 is required for equivalent results. Since Conco 2Al customarily contains about 7.0% monosulfonated diphenyl oxide and 40% of the disulfonated diphenyl oxide (the remainder being largely water and inactive contaminants), a particularly preferred crystal growth enhancer would have the following approximate composition.

| Disodium diphenyl oxide disulfonate | 31–33 |
|---|---|
| Monosidium diphenyl monosulfonate | 5–6 |
| Sodium oleyl sulfate | 19–21 |
| Other | 42–43 |

The commercial disulfonates sometimes contain a small proportion of monosulfonate as an impurity and this monosulfonate fraction should be taken into consideration when preparing the combination of this invention. The determination of the amount is well within the skill of the ordinary artisan.

The preferred monosulfonate of this invention is lauryl diphenyloxide sulfonate. However, other monosulfates or monosulfonates may be used, e.g. a monosulfate of a fatty acid of from 5 to 20 carbon atoms. Sulfated oleic acid is a preferred compound. It is commercially available and the commercial product is free from significant amounts of the disulfated compound. The monosulfonate or mono-sulfate is neutralized with a suitable cation which may be the same as that used for the disulfonate or it can be different. Mixtures of monosulfonates or sulfates may also be used.

Sulfated fatty acid surfactants alone are not effective in enhancing crystal growth. When sodium oleyl sulfate was employed, crystal growth response was poor at all concentrations tested and the reaction time was prohibitively long.

The neutralized sulfonic or sulfated acids may be mixed together before they are added to the reaction mixture or they may be added separately. They can be pre-dissolved or slurried in a minimum amount of water and added either to the KCl solution or to the reaction mixture; or the sulfonates can be added as solids. Preferably, they are dissolved in a minimum amount of water and added to the KCl solution before adding the langbeinite.

Advantageously—and unexpectedly—the improved process provides considerable savings in energy requirements. When produced by the previous process, the moisture content of a 1″ thick filter cake (7.9 lb of solids per square foot of filter cloth) was reduced to about 10% by weight at an air flow of 8 SCFM/ft$^2$ and required about 31.6 sec. drying time. By comparison, using the improved process, the moisture content was reduced to 6.5% (35% reduction) in only 12 seconds (37% of the previous drying time).

The invention will be better understood with reference to the following examples. It is understood that these examples are intended only to illustrate the invention and it is not intended that the invention be limited thereby.

EXAMPLE 1

A sample of langbeinite was ground and screened to pass 200 Tyler mesh and was used in this and the following examples. The potassium chloride used was technical grade in order to eliminate any possible interfering components which might be present in cruder material. Similarly, distilled water was selected for all tests.

Potassium chloride, 350 g, was dissolved in distilled water, 1 kg, at 45° C. As a crystal growth enhancer, there was added to the potassium chloride solution 2.32 g of a commercial grade sodium salt of alkylated diphenyloxide disulfonic acid (Dowfax 2A1, product of Dow Chemical Company) containing 47% of total surfactant. This product contained, as an impurity, the monosulfonate in an approximate weight ratio of 0.053 to the disulfonate. Diesel oil, 1 cc, was added as an antifoam agent. Langbeinite, 350 g, ground to less than 200 Tyler mesh, was added. The mixture was heated to 55° C. and agitated throughout the reaction period. The progress of the reaction was followed by monitoring the magnesium concentration in the liquid phase. The resulting K$_2$SO$_4$ crystals were separated by centrifugation, washed with organic solvents, dried and screened. The total yield of crystals was approximately 290 g. This experiment was designated as the control. The results are given in the table.

The foregoing experiment was repeated except that there was substituted for the surfactant 0.62 g of the same growth enhancer fortified with the monosulfonate to provide a weight ratio of 0.18. The results obtained are given in the table.

EXAMPLES 2-5

The experiment of Example 1 was repeated in all essential details except that the ratio of monosulfonate to disulfonate was varied, as was the total amount used. The results are given in the table.

| Example | Ratio | Surfactant g | Crystals Retained, %, On 20 Mesh | 14 | 10 | 8 |
|---|---|---|---|---|---|---|
| Control | 0.053 | 1.09 | 0.5 | — | — | — |
| 1 | 0.18 | 0.62 | 51 | 21 | 1 | — |
| 2 | 0.26 | 0.66 | 50 | 43 | 24 | — |
| 3 | 0.32 | 0.70 | 56 | 45 | 33 | 2 |
| 4 | 0.46 | 0.78 | 55 | 49 | 36 | 3 |
| 5 | 0.59 | 0.85 | 21 | — | — | — |
| 6 | 0.18 | 0.55 | 59 | 46 | 6 | — |
| 7 | 0.35 | 0.53 | 48 | 3 | — | — |
| 8 | 0.51 | 0.51 | 58 | 58 | 1 | — |
| 9 | 0.40 | 0.53 | 60 | 60 | 24 | — |

EXAMPLE 6

The experiment of Example 1 was repeated in all essential details except that 0.55 g of a commercial product (Conco 2Al) having a mono to disulfonate ratio of 0.18 was substituted as the growth enhancer.

EXAMPLE 7

The experiment of Example 1 was repeated in all essential details except that a commercial grade of the sodium salt of sulfated oleic acid was used to fortify the monosulfonated component. Analysis showed that the monosulfated oleic acid contained no significant amount of disulfated compound.

The mixture of mono- and disulfonate (in this and the following examples, the term "mono" is intended to include monosulfonate and monosulfate) was mixed into the KCl solution first and the sulfated oleic acid was added. A total of 0.5264 of surfactant (100% active basis) was used as the growth enhancer. It had the following composition:

| Disulfonate | 0.3884 | 73.79% |
|---|---|---|
| Monosulfonate | 0.0204 | 3.87% |
| Sulfated Oleic Acid | 0.1176 | 22.34% |

The ratio of mono to disulfonate was 0.36.

EXAMPLE 8

The experiment of Example 7 was repeated in all essential details except that all of the growth enhancers were added to the KCl at the same time. A total of 0.5149 g of enhancer (100% active basis) was added. It had the following composition:

| Disulfonate | 0.3415 g | 66.32% |
|---|---|---|
| Monosulfonate | 0.0180 | 3.50% |
| Sulfated Oleic Acid | 0.1554 | 30.18% |

The ratio of mono to disulfonate was 0.51.

EXAMPLE 9

The experiment of Example 8 was repeated in all essential details except that 0.5293 g of the growth enhancer was used. It had the following composition:

| Disulfonate | 0.3789 | 71.59% |
| Monosulfonate | 0.0563 | 10.63% |
| Sulfated Oleic Acid | 0.0941 | 17.78% |

The ratio of mono to disulfonate was 0.40.

EXAMPLE 10

The experiment of Example 6 is repeated except that a purified grade of sodium laurel diphenyloxide disulfonate having no significant amount of the monosulfonate is used in place of Dowfax 2A1. The ratio is 0.25. A good harvest of large crystals is obtained.

We claim:

1. An improved process for the production of potassium sulfate crystals by the reaction of a saturated solution of potassium chloride with langbeinite in the solid phase at a temperature of from 45°–55° C., thereby forming potassium sulfate crystals and magnesium chloride solution comprising the step of conducting the reaction in the presence of from 1.2 to 2.4 kg per ton of langbeinite of a crystal growth enhancer consisting of from about 0.20 to 0.50 parts by weight of component (A) per part of component (B) wherein (A) is a mixture of neutralized alkylated diphenyloxide mono-sulfonic acid and a neutralized monosulfated fatty acid of 5 to 20 carbon atoms in a ratio of 1.66-20 parts of neutralized sulfated oleic acid per part of neutralized alkylated diphenyloxide monosulfonic acid and component (B) is a neutralized alkylated diphenyloxide disulfonic acid, wherein the acids are neutralized with sodium or potassium cations and the alkylated moiety of the diphenyloxide mono- or disulfonic acid is of from 10 to 14 carbon atoms and may be branched chain or straight chain or mixtures thereof.

2. The process of claim 1 wherein the monosulfonated surfactant is a neutralized alkylated diphenyloxide monosulfonic acid and the disulfonated surfactant is alkylated diphenyloxide disulfonate.

3. The process of claim 2 wherein the alkyl group is straight chain.

4. The process of claim 2 wherein the alkyl group is branched chain.

5. The process of claim 2 wherein the alkyl group is lauryl.

6. The process of claim 2 wherein the surfactant is sulfated oleic acid.

* * * * *

UNITED STATES PATENT AND TRADEMARK OFFICE
CERTIFICATE OF CORRECTION

PATENT NO. : 4,562,058
DATED : December 31, 1985
INVENTOR(S) : W. B. Dancy and Hsi Meng It is certified that error appears in the above-identified patent and that said Letters Patent are hereby corrected as shown below:

Column 2, line 28, "Conco Chemical Company as Conco 2A1" should read -- Continental Chemical Co. as Conco sulfate 2A-1 (Conco 2A1) --

Column 2, line 42, "minimixe" should read -- minimize --

Column 2, line 58, in the table, "Monosidium" should read -- Monosodium --

Signed and Sealed this

Third Day of June 1986

[SEAL]

Attest:

DONALD J. QUIGG

Attesting Officer

Commissioner of Patents and Trademarks